Sept. 2, 1969   E. BROWN   3,464,755
DUMP TRAILER SAFETY DEVICE
Filed July 24, 1967   3 Sheets-Sheet 1

INVENTOR.
EDWARD BROWN
BY
Woodard, Weikart, Emhardt & Naughton
Attorneys

Sept. 2, 1969            E. BROWN            3,464,755

DUMP TRAILER SAFETY DEVICE

Filed July 24, 1967            3 Sheets-Sheet 2

INVENTOR.
EDWARD BROWN

BY

*Woodard, Weikart, Emhardt & Naughton*
Attorneys

Sept. 2, 1969  E. BROWN  3,464,755
DUMP TRAILER SAFETY DEVICE
Filed July 24, 1967  3 Sheets-Sheet 3

INVENTOR.
EDWARD BROWN
BY
Woodard, Weikart, Emhardt & Naughton
Attorneys

United States Patent Office 3,464,755
Patented Sept. 2, 1969

3,464,755
DUMP TRAILER SAFETY DEVICE
Edward Brown, 4544 Edmonson St.,
Indianapolis, Ind. 46226
Filed July 24, 1967, Ser. No. 655,362
Int. Cl. B60p 1/30
U.S. Cl. 298—22     10 Claims

ABSTRACT OF THE DISCLOSURE

A dump trailer safety device having a tilt switch for mounting on the frame or an axle of a dump trailer, a solenoid valve operated by the tilt switch, and a pneumatic cylinder and piston operated by the solenoid valve to override manual control of the dump trailer to permit dumping of the dump trailer only when the dump trailer is substantially horizontal.

BACKGROUND OF THE INVENTION

Field of the invention

The present invention relates generally to land vehicles, dumping, and more particularlly to tilting operating mechanism for controlling vehicle dumping.

Description of the prior art

Several safety devices have been developed for use with dump trucks and dump trailers. One such device is shown in Morano, 2,887,672, which shows an electrical switch and lamp for indicating to the driver when the dump bed is in an elevated position. Other devices, such as those shown in McManus 3,039,822 and Vestin 3,203,735, operate to stabilize a dump trailer or a dump truck during its dumping cycle.

Frequently, a dump trailer must be dumped on uneven ground such as fresh land fill. On fresh land fill, the wheels on one side of the trailer may settle more or less than the wheels on the other side of the trailer, and cause the trailer to capsize when it is being dumped. The turning moment acting on the trailer, especially when a load hangs up in the trailer, may easily exceed the capacity of stabilizing devices, such as those set forth above.

Field experience indicates that the best way to prevent a dump trailer from capsizing when it is being dumped is to lower the dump bed if the lateral tilt of the trailer exceeds a predetermined angle from the horizontal. This angle, however, is generally small and therefore, difficult to judge.

The present invention solves this problem by providing a device which senses the lateral tilt or roll angle of the trailer and automatically lowers the trailer if it is being dumped, or if the trailer is not being dumped, prevents it from being dumped, should the roll angle exceed the predetermined angle from the horizontal.

Summary of the invention

The device of the present invention is intended to prevent overturning of dump trailers. It includes a tilt-switch for mounting on an axle of a trailer, indicator lamps for indicating when the dumping mechanism is energized and when the tilt switch is closed, and a solenoid valve operated by the tilt switch and powered by the tractor electrical system. The solenoid valve in turn controls the operation of a cylinder and piston that is connected through a linkage to the dump control lever. Substantially all dump trailers are dumped by a hydraulic cylinder, generally of the telescoping type. Hydraulic power is provided by a pump driven by a power takeoff coupled to the tractor engine. So that the indicator lamps and the solenoid will not be energized except when the power takeoff is engaged, the device of the present invention is provided with a switch coupled to the power takeoff control which disables the device except when the power takeoff is engaged.

In order to dump the trailer, it is necessary to engage the power takeoff to drive the pump to supply hydraulic pressure to the telescoping cylinder. When the power takeoff is engaged, a switch is closed which energizes a green indicating lamp and connects the positive side of the tractor electrical system to one side of the solenoid and to one side of a red indicating lamp. The other side of the red indicating lamp and the other side of the solenoid are connected together and are connected to the negative side of the tractor electrical system by way of the tilt switch. If the roll angle is within the predetermined angle from the horizontal, the tilt switch is open and the red indicating lamp and the solenoid are not energized. However, if the roll angle is beyond the predetermined angle, the red indicating lamp and the solenoid are energized. When the solenoid is energized, it operates the cylinder and piston connected through the linkage to the dump control and overrides the operator's manual control.

It will be seen that if the roll angle is not within the predetermined angle from the horizontal, the device of the present invention will override any manual control and move the dump control to the "lower" position. Therefore, if the trailer is being dumped when the tilt switch closes, the dump control will be moved to the "lower" position, thereby lowering the trailer. If the trailer is not being dumped when the tilt switch closes, the device will prevent the dump control from being moved to the "raise" position.

It is therefore an object of the present invention to provide an improved dump trailer safety device.

It is a further object of the present invention to provide a dump trailer safety device which will prevent dump trailers from being overturned when they are being dumped.

It is also an object of the present invention to provide a device which will sense the roll angle of a dump trailer and lower a trailer being dumped should the roll angle exceed a predetermined angle from the horizontal.

It is still another object of the present invention to provide a device which will prevent a dump trailer from being dumped unless the roll angle is within a predetermined angle from the horizontal.

These and other objects and advantages of the present invention will become apparent as the description proceeds, reference being had to the attached drawings and appended claims.

Description of the preferred embodiments

Figure 1:
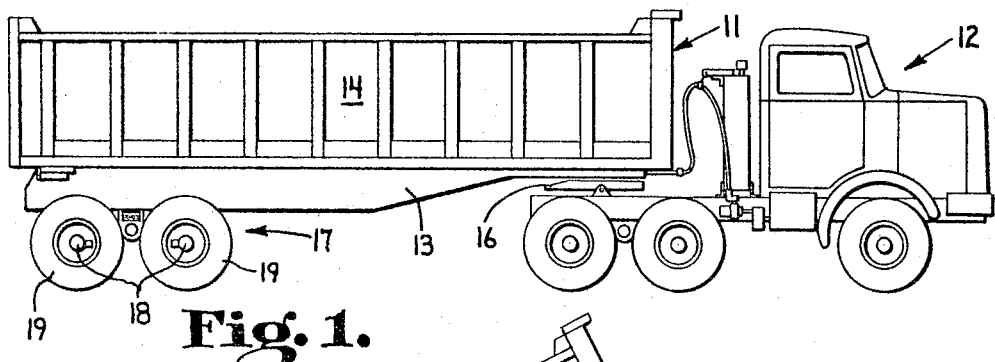
FIG. 1 is a somewhat diagrammatic side elevation of a dump trailer and tractor with the dump trailer in the lowered position.
Figure 2:
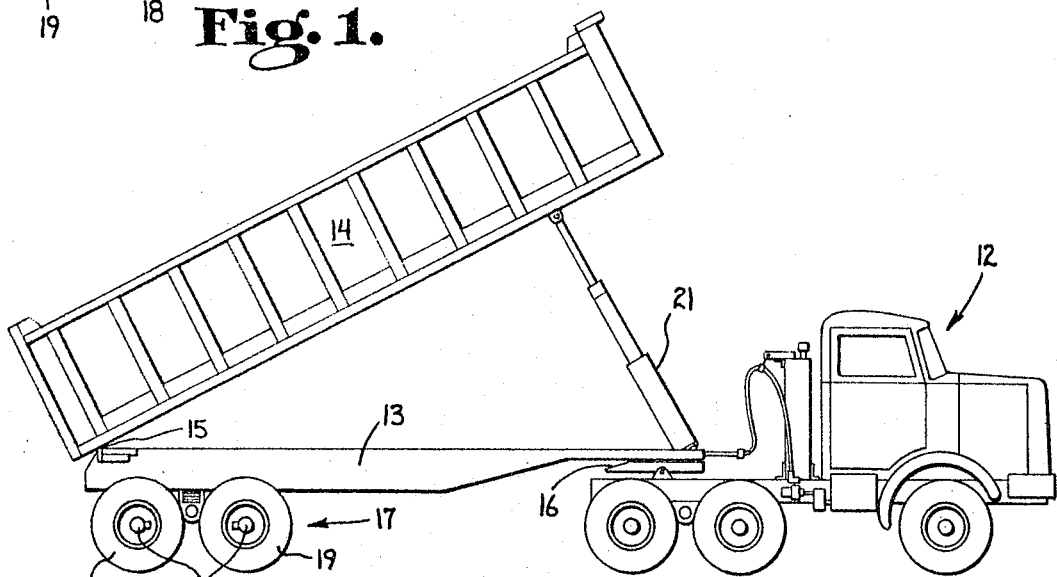
FIG. 2 is a somewhat diagrammatic side elevation of a dump trailer and tractor with the dump trailer in the raised position.

Referring now to FIGS. 1 and 2 there is shown a dump trailer 11 coupled to a tractor 12. The dump trailer 11 has a frame 13, a dump bed 14, and is supported by a fifth wheel 16 and an undercarriage 17. To the undercarriage 17 are mounted axles 18 and wheels 19. The dump bed is pivotally mounted to the frame 13 by a dumping axis 15 located near the rear of the frame, and is raised to the dumping position by a telescoping cylinder 21 which has one end pivotally mounted to the frame 13 at a point near the front end of the frame and the other end pivotally mounted to the dump bed 14 at a point near the front of the dump bed.

Figure 3:
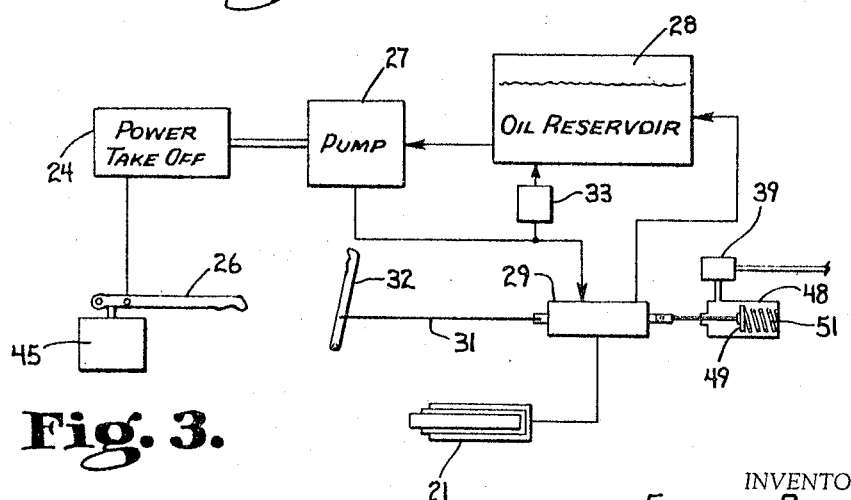
FIG. 3 is a schematic representation of a hydraulic system for dumping the trailer.

The hydraulic system for powering the telescoping cylinder 21 is shown diagrammatically in FIG. 3. A power takeoff 24 coupled to the engine of the tractor 12, and which may be engaged or disengaged by the lever 26, drives a hydraulic pump 27. The pump 27 receives oil from a reservoir 28 and discharges it to a cylinder control valve 29. The cylinder control valve 29 is connected by a linkage 31 to the dump lever 32, which may be manually operated to move the cylinder control valve 29 to the "raise" or "lower" position.

In the "raise" position, the cylinder control valve 29 connects the discharge of the pump 27 to the telescoping cylinder 21, thereby admitting oil under pressure to the telescoping cylinder 21 to cause it to extend and raise the dump bed 14. In the "lower" position the cylinder control valve 29 shuts off the discharge of the pump 27 and connects the telescoping cylinder 21 to the reservoir 28. In this position, the dump bed 14 is allowed to return under its own weight to the lowered position, the oil in the telescoping cylinder 21 being drained to the reservoir 28. The hydraulic system may also include a bypass valve 33 for returning the discharge of the pump 27 to the reservoir 28 when the cylinder control valve 29 is in the "lower" position.

A rather common mishap with dump trailers is overturning or capsizing while they are being dumped. This is because raising the dump bed 14 substantially raises the center of gravity of the dump bed. If the trailer 11 is tilted to one side, raising the dump bed 14 will also move the center of gravity laterally, thereby creating a turning moment which tends to overturn the dump trailer 11. Because the spring suspension of the undercarriage 17 will permit the axle 18 to vary considerably from horizontal while the trailer frame 13 remains substantially horizontal, it is often difficult to judge before the dump bed 14 is raised whether the dumping axis 15 is substantially horizontal. Also, especially when dumping on fresh land fill, and because weight is shifted from the tractor to the trailer wheels 19 when the dump bed 14 is raised, the trailer wheels 19 may settle quite rapidly and shift the trailer axles 18 from the horizontal. The initial settling motion is difficult to detect because of the spring suspension of the undercarriage 17. By the time the operator has detected the shift, it is often too late for him to lower the dump bed 14, and the trailer overturns.

Field experience has shown that in substantially every case of an overturned dump trailer, the accident could have been prevented either had the trailer been properly positioned before dumping, or had the operator had sufficient notice that the trailer was shifting.

It has further been learned through field experience that many truck drivers are not sufficiently familiar with the operation of dump trailers to properly judge when the trailer may be safely dumped or, when it is being dumped that it is in danger of overturning. It has also been found that when a driver is in a hurry, he may unnecessarily risk overturning the trailer rather than take the time to position it properly.

Damages to dump trailers caused by overturning are very expensive to repair. Furthermore, down time is expensive and high frequency of overturning causes the insurance premiums on dump trailers to be quite high.

The foregoing discussion points up the need for a dump trailer safety device that will eliminate or reduce the overturning of dump trailers. It also shows that although an indicating type device would prevent many accidents, the best solution to the problem is a device that will override the operator's manual control either to prevent raising the dump bed or to lower it should the roll angle shift beyond a predetermined angle from the horizontal.

Figure 6:
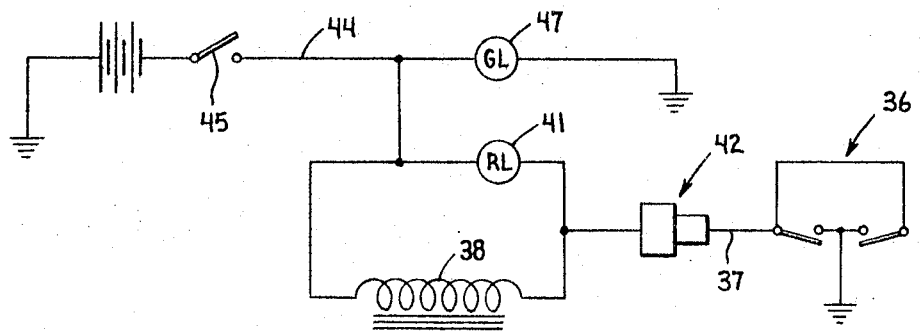
FIG. 6 is an electrical schematic diagram of the device of the present invention.

The present invention provides such a device which is illustrated diagrammatically in FIGS. 3 and 6. A tilt switch 36 mounted on the trailer is adapted to close an electrical contact when the roll angle of the trailer exceeds a predetermined angle from the horizontal. As used herein, roll angle applies to both the angular position of the axle 18 as well as the angular position of the dumping axis 15 with respect to the horizontal. Whether the tilt switch 36 is mounted to the trailer frame, and therefore senses the position of the dumping axis 15, or is mounted to an axle and senses axle position is a matter of choice that depends upon the particular dump trailer and its particular uses.

Figure 4:
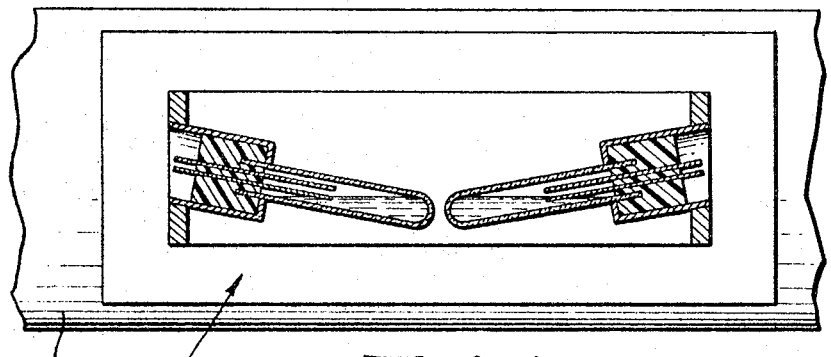
FIG. 4 is an elevation view partly in section showing one embodiment of the tilt switch of the present invention.

One embodiment of the tilt switch 36 has two mercury in glass switches arranged in a vertical plane in an enclosure as shown in FIG. 4. The enclosure is mounted to one side of an axle 18 to prevent its being damaged should the trailer be taken over rugged terrain. It will be seen from the configuration of FIG. 4 that when the axle 18 is horizontal, neither of the two mercury in glass switches is closed, but if the axle is positioned away from the horizontal, the mercury in one of the two switches will flow toward its contacts and thereby close that switch.

Figure 5:
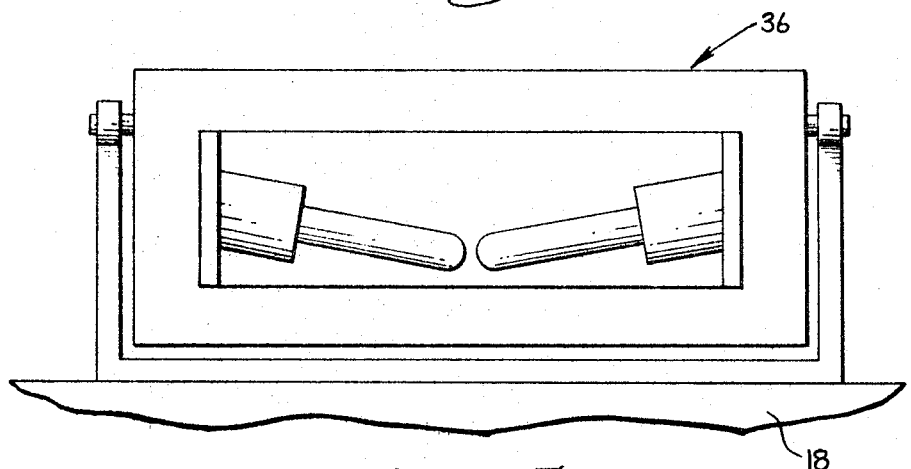
FIG. 5 is an elevation view partly in section showing another embodiment of the tilt switch of the present invention.

Another embodiment of the tilt switch 36 which is especially adapted for use with frameless dump trailers, such as that illustrated in McManus, 3,039,822, wherein during dumping the undercarriage of the trailer is also pivoted, is shown in FIG. 5. In this embodiment, the switch 36 is mounted on an axis parallel to the axle 18 so that as the axle is raised and rotated, the switch enclosure will hang vertically downward and thereby maintain the glass tubes in a substantially vertical plane.

The contacts of the two mercury in glass switches are connected in parallel as shown in FIG. 6, so that tilting in either direction will complete the circuit. Also, the glass tubes may be formed with a small "hump" to provide a rapid or "snap" action when they are tilted. The particular angle with which the tubes are positioned will determine the angle at which the mercury will flow to the contacts and close the switch.

One side of the tilt switch 36 is connected through the trailer frame 13, the fifth wheel and the tractor frame to the negative side of the tractor electrical system. The other side of the tilt switch is connected by a conductor 37 to one side of a coil 38 of a solenoid valve 39 and a red indicator lamp 41 mounted on the tractor 12. The conductor 37 may pass through a plug and receptacle 42 which facilitates disconnecting the tractor 12 from the dump trailer 11.

A conductor 44 connects the positive side of the tractor electrical system to one side of a limit switch 45. The limit switch 45, as shown in FIG. 3, is operated by the power takeoff lever 26, and is adapted to close its contact when the power takeoff lever is in the engaged position. It should be noted, however, that the switch 45 need not be directly operated by the power takeoff lever 26, but may be operated by any mechanical movement connected with the power takeoff 24 that will provide the desired operation.

Referring again to FIG. 6, the other side of the limit switch 45 is connected to one side of a green indicator lamp 47 and to the other side of the red indicator lamp 41 and the coil 38 of the solenoid valve 39. The other side of the green indicator lamp 47 is connected to the negative side of the tractor electrical system.

The solenoid valve 39 is connected to a cylinder 48 having a piston 49. The cylinder 48 and piston 49 are fluid operated and may be either pneumatic or hydraulic.

In the preferred embodiment, the piston 49 is spring biased to its fully extended position by a spring 51. Air admitted to the cylinder 48 through the port 52 acts on the piston 49 to move the piston 49 against the spring 51 to its fully retracted position.

The air admitted to the cylinder 48 is controlled by the solenoid valve 39, which is preferably of the three-way type. When the coil 38 of the solenoid valve 39 is de-energized, the cylinder 48 is vented to the atmosphere. When the coil 38 is energized, it moves the valve 39 to a position wherein the cylinder 48 is connected to the air supply of the tractor 12.

The piston 49 is coupled to the cylinder control valve 29 to move the cylinder control valve 29 to the "lower" position and to prevent the cylinder control valve 29 from being moved to the "raise" position when the piston 49 is in its retracted position.

Figure 7:
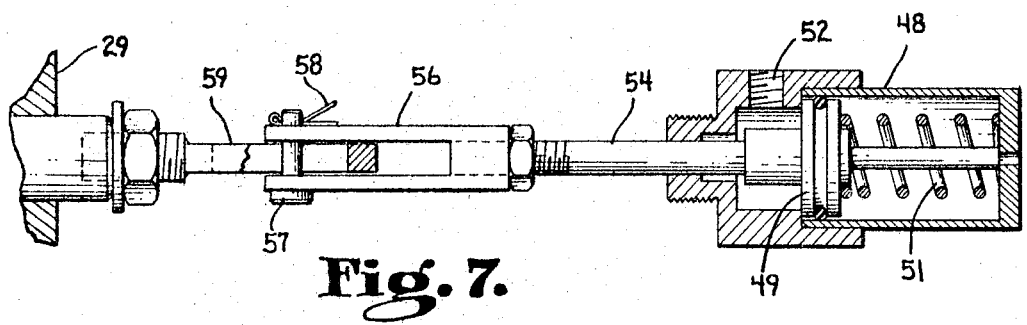
FIG. 7 is a detailed view of one embodiment of the linkage of the present invention.

FIG. 7 shows one embodiment of the coupling between the piston 49 and the cylinder control valve 29. In this embodiment, a piston rod 54 affixed to the piston 49 is threadedly coupled to a clevis 56. The clevis 56 has a pin 57, which may be secured in place by a cotter pin 58, and which is slidably coupled to the cylinder control valve 29 by means of a slotted member 59 which is threadedly coupled to the cylinder control valve 29 at the end opposite where the dump lever linkage 31 is connected.

In operation, when the power takeoff 24 is disengaged, the switch 45 is open, and the device of the present invention is disabled. This prevents intermittent flashing of the indicator lamp 41 as the tractor 12 and trailer 11 are being driven along the road. When the driver has reached the dumping site, he positions the trailer for dumping and engages the power takeoff 24 to drive the pump 27 to supply hydraulic power for the telescoping cylinder 21. When the power takeoff 24 is engaged, the switch 45 is closed, completing the electrical circuit through the green indicating lamp 47, causing it to glow.

If the roll angle of the dump trailer is within the predetermined angle from the horizontal, the tilt switch 36 will be open, and even though switch 45 is closed, the electrical circuits through the red indicating lamp 41 and the coil 38 are not completed. The driver may move the dump lever 32 to the "raise" position and dump the trailer.

If, when the driver positions the trailer for dumping and engages the power takeoff 24, the roll angle exceeds the predetermined angle from the horizontal, the tilt switch 36 will have one of its contacts closed, energizing the red indicating lamp 41 and the solenoid 38. The red indicating lamp 41 will indicate to the driver that he must re-position the trailer before dumping. However, should the red indicating lamp be burnt out, or should the driver disregard it, he is prevented from dumping the trailer by the action of the solenoid valve 39, which admits air to the cylinder 48 to move the piston 49 to its retracted position, thereby holding the cylinder control valve 29 in its "lower" position by means of the piston rod 54, clevis 56 and slotted member 59.

Also, should the trailer be substantially horizontal when the driver energizes the power takeoff 24, and shift beyond the predetermined angle from the horizontal only after the trailer is being dumped, the tilt switch 36 will close a contact to energize the red indicating lamp 41 and the coil 38 of the solenoid valve 39. By substantially the same sequence as set forth above, the piston 49 is moved to its retracted position. In this case, however, the movement of the piston 49 is translated to the cylinder control valve 29 to override the driver's manual control and move the cylinder control valve to the "lower" position, thereby lowering the trailer before the turning moment becomes large enough to overturn it.

Figure 8:
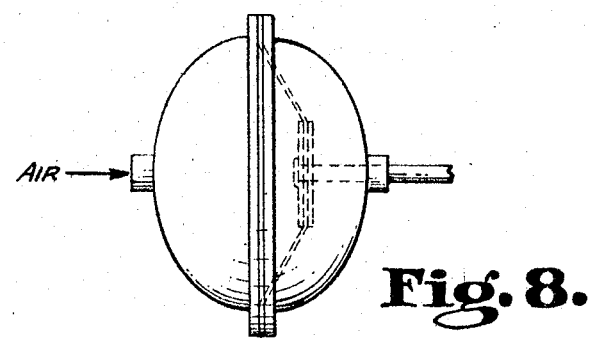
FIG. 8 shows a pneumatic diaphragm which may be used in the present invention.

As mentioned above, the fluid operated cylinder 48 and piston 49 may be either pneumatic or hydraulic. Similarly, the cylinder 48 and piston 49 may be replaced by a pneumatic diaphragm type device such as shown in FIG. 8. One such device readily available in the trucking industry and which may easily be adapted for use in the present invention is a diaphragm operator of the type commonly used for trailer air brakes.

It will be seen from the above description that the present invention provides a dump trailer safety device which will prevent dump trailers from being overturned when they are being dumped and will prevent a dump trailer from being dumped unless the roll angle is within a predetermined angle from the horizontal. It will also be clear from the above description that the safety device of the present invention readily lends itself to use on original and existing tractors and trailers, and that it may be made quite rugged, long-lived and maintenance free.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected. For example, as pointed out above, the cylinder 48 and piston 49 may be replaced with a diaphragm type device. Also, a different linkage arrangement for connecting the piston rod 54 to the cylinder control valve 29 may be more suitable in those cases where the cylinder control valve 29 is connected to the dump lever 32 by a flexible control cable rather than a linkage 31. Furthermore, the tilt switch may be mounted to the trailer frame, to an axle, or two or more tilt switches may be mounted on a trailer, one on the frame and one or more on the axles.

The invention claimed is:

1. In combination with a dump trailer and a tractor for pulling said trailer, said tractor having a power takeoff for driving a hydraulic pump to pump oil into a telescoping cylinder to dump said dump trailer, a power takeoff control member for engaging and disengaging said power takeoff, and a cylinder control valve for admitting the discharge of said pump to said telescoping cylinder and for shutting off the discharge of said pump and venting said telescoping cylinder to a reservoir, a dump trailer safety device comprising position detecting means for detecting when the roll angle of said dump trailer is beyond a predetermined angle from the horizontal, and manual control override means coupled to said position detecting means and to said cylinder control valve and responsive to operation of said detecting means to operate said control valve for overriding manual control of dumping said dump trailer when said roll angle is beyond said predetermined angle from the horizontal.

2. The invention of claim 1 further comprising first indicating means coupled to said position detecting means for indicating when said roll angle is beyond said predetermined angle from the horizontal.

3. The invention of claim 1 further comprising disabling means coupled to said safety device and to said power takeoff control member and operable by said control member for disabling said dump trailer safety device when said power takeoff is disengaged by said control member.

4. The invention of claim 1 further comprising disabling means coupled to said safety device and to said power takeoff control member and operable by said control member for disabling said dump trailer safety device when said power takeoff is disengaged by said control member, and second indicating means coupled to said disabling means for indicating when said power takeoff is engaged.

5. The invention of claim 4 wherein said position detecting means includes a tilt switch mounted to said dump trailer and adapted to close an electrical contact when said roll angle is beyond said predetermined angle from the horizontal, said manual control override means includes a pneumatic cylinder and piston coupled to and controlled by a three-way solenoid valve having an electrical coil, said piston being coupled by a linkage to said cylinder control valve, said first and second indicating means include electric lamps, said disabling means includes an electrical limit switch, one side of said limit switch being connected to the positive side of the tractor electrical system, the other side of said limit switch being connected to one side of said first indicating means, to one side of said second indicating means and to one side of the coil of said solenoid valve, the other side of said second indicating means being connected to the negative side of said tractor electrical system, the other side of said first indicating means and the other side of said coil being connected together and to one side of said tilt switch, the other side of said tilt switch being connected to the negative side of the tractor electrical system.

6. In combination with a vehicle having a wheel mounted undercarriage, a dump body, a dumping actuator connected to said dump body to dump said body, a first source of fluid pressure, control valve means coupled to said source and to said actuator to apply fluid from said source to said actuator and for shutting off said source from said actuator and venting said actuator, a safety device comprising inclination detecting means supported by said undercarriage and oriented thereon for detecting when the roll angle of said undercarriage is beyond a predetermined angle from the horizontal, and manual control override means coupled to said inclination detecting means and to said control valve means and responsive to operation of said detecting means to operate said control valve means for overriding manual control of dumping said dump body when said roll angle is beyond said predetermined angle from the horizontal.

7. The invention of claim 6 further comprising first indicating means coupled to said detecting means for indicating when said roll angle is beyond said predetermined angle from the horizontal.

8. The invention of claim 6 wherein said detecting means includes a mercury in glass tilt switch adapted to close a contact when said roll angle is beyond said predetermined angle from the horizontal.

9. The invention of claim 6 wherein said manual control override means includes a solenoid valve having an electrical coil, said coil being coupled to said detecting means.

10. The invention of claim 6 wherein said manual control override means includes a fluid operated element, a solenoid valve coupled to said fluid operated element for controlling the flow of fluid thereto, said solenoid valve having an electrical coil, and said coil being coupled to said detecting means.

References Cited

UNITED STATES PATENTS

| | | | |
|---|---|---|---|
| 2,359,961 | 10/1944 | Anthony | 280—6 X |
| 2,556,610 | 6/1951 | Biszantz | 298—17 |
| 2,684,254 | 7/1954 | Goss | 280—6 X |
| 2,692,652 | 10/1954 | Wilson | 180—104 |
| 2,887,672 | 5/1959 | Morano | 340—52 |
| 2,999,721 | 9/1961 | Wood | 298—17 |
| 3,041,111 | 6/1962 | Wyrick | 298—1 |

RICHARD J. JOHNSON, Primary Examiner

U.S. Cl. X.R.

180—104; 340—53